Oct. 28, 1969     M. STARK ET AL     3,475,631

CANNED MOTOR PUMP

Filed Aug. 8, 1967     2 Sheets-Sheet 1

INVENTORS
Michael Stark and
George E. Bollibon

BY

*[signature]*

ATTORNEY

Oct. 28, 1969   M. STARK ET AL   3,475,631
CANNED MOTOR PUMP

Filed Aug. 8, 1967   2 Sheets-Sheet 2

United States Patent Office 3,475,631
Patented Oct. 28, 1969

3,475,631
CANNED MOTOR PUMP
Michael Stark, Oakmont, and George E. Bollibon, Murrysville, Pa., assignors to Westinghouse Electric Corporation, Pittsburgh, Pa., a corporation of Pennsylvania
Filed Aug. 8, 1967, Ser. No. 659,174
Int. Cl. H02k 9/00, 1/32, 9/20
U.S. Cl. 310—58                                    10 Claims

ABSTRACT OF THE DISCLOSURE

A canned motor pump is so constructed that it is cooled by air or other gas circulated through passageways and radial ducts in the stator structure. Additional cooling can be provided by circulating liquid obtained from the main impeller casing through the rotor cavity and the gap between the rotor and the stator can. An external heat exchanger may be included in the liquid cooling system.

BACKGROUND OF THE INVENTION

This invention relates, generally, to centrifugal pumps and, more particularly, to canned motor pumps for circulating a liquid in a circulatory system.

In prior canned motor pumps, at least the stator windings have been hermetically sealed by means of a stator can to protect the windings, and the motor has been cooled by circulating liquid obtained from the main impeller casing through the rotor cavity in the stator structure. Additional cooling has been obtained by circulating liquid from an external source through a heat exchanger surrounding the outside of the stator housing. This required an external source of cooling liquid and an external heat exchanger.

An object of this invention is to provide an efficient gas cooled canned motor pump.

Another object of the invention is to simplify and strengthen the structure of a canned motor pump.

A further object of the invention is to provide a canned motor pump adaptable for gas and liquid cooling.

Other objects of the invention will be explained fully hereinafter or will be apparent to those skilled in the art.

SUMMARY

In accordance with one embodiment of the invention, generally channel-shaped wedges are provided in the tops and the bottoms of the winding slots in the stator laminations of a motor pump and radial vents are also provided in the laminations to permit gas circulation through the stator structure. The top ends of a plurality of building bars equally spaced around the outer periphery of the laminations are welded to the upper finger plate, and the bottom ends of the bars are welded to the lower flange or end ring, thereby tying the stator core together. The upper end ring is also welded to the upper finger plate. Stator windings are sealed off from the rotor cavity with a can welded to the end rings. A cover between building bars contains a vertical gas duct and openings are provided in the cover between two adjacent air vents inside and outside the air duct. An additional cover extends around the outside of the building bars to provide two separate air chambers. A blower circulates air or other suitable gas around the upper coil end turns. Part of the air or gas flows through the channel-shaped wedges and radial vents in the laminations into one chamber inside the gas duct. Additional air or gas is blown around the outside of the stator core between the outer cover and the gas duct. This air enters the other chamber and radial vents from outside the stator core. The air is discharged from both chambers to the lower coil end turns and then to atmosphere. Additional cooling can be provided by circulating liquid obtained from the main impeller casing through the rotor cavity and the gap between the rotor and the stator can. An external heat exchanger can be connected in the liquid cooling system.

BRIEF DESCRIPTION OF THE DRAWINGS

For a better understanding of the nature and objects of the invention, reference may be had to the following detailed description, taken in conjunction with the accompanying drawings, in which.

Figure 1:
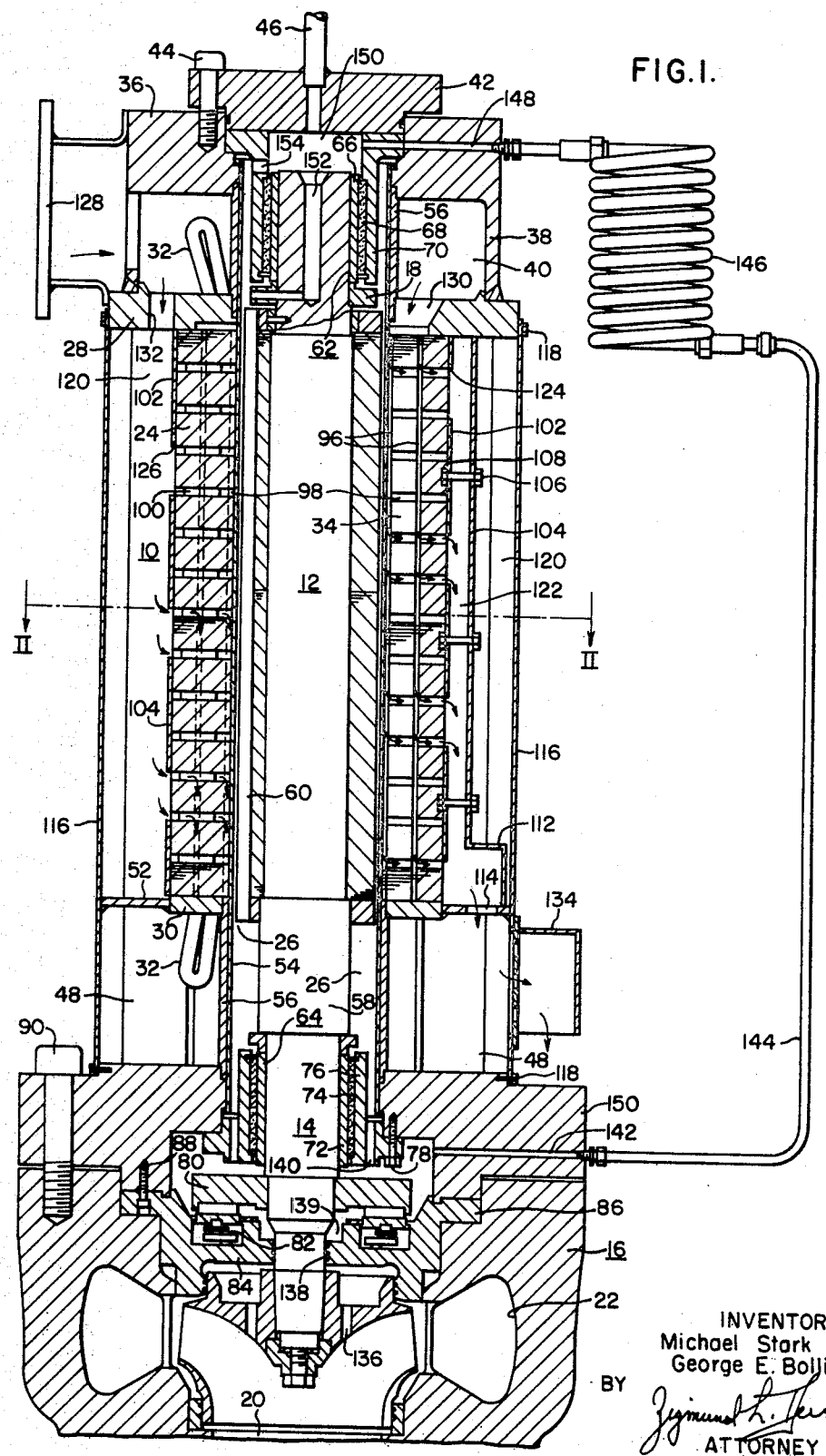
FIGURE 1 is a view, in longitudinal section, of a canned motor pump embodying principal features of the invention.

Referring to the drawings, and particularly to FIG. 1, the motor pump structure shown therein comprises a stator assembly 10, a rotor assembly 12, a main impeller 14 driven by the rotor 12, a casing 16 for the impeller 14, and an auxiliary impeller 18 also driven by the rotor 12. The casing 16 has an inlet opening 20 and a discharge opening 22. The motor pump may be connected in a circulatory system to circulate a liquid through the system in a manner well known in the art.

The stator assembly 10 includes a plurality of annular laminations 24 having a cylindrical bore to provide a rotor cavity 26 through the laminations. The laminations 24 are stacked between an upper finger plate 28 and a lower finger plate 30. Stator windings 32 are disposed in radial slots 34 in the laminations 24 in the usual manner. Power conductors may be connected to the windings 32 in a suitable manner. An upper end ring 36 has a downwardly extending annular flange 38 which is welded, or otherwise secured, to the upper finger plate 28, thereby providing a chamber 40 between the end ring 36 and the finger plate 28. A stator cap 42 is attached to the end ring 36 by means of bolts 44. A vent pipe 46 is provided in the end cap 42 to permit air to be exhausted from within the rotor cavity 26. A suitable cap or vent valve (not shown) may be provided for the vent pipe 46.

Figure 2:
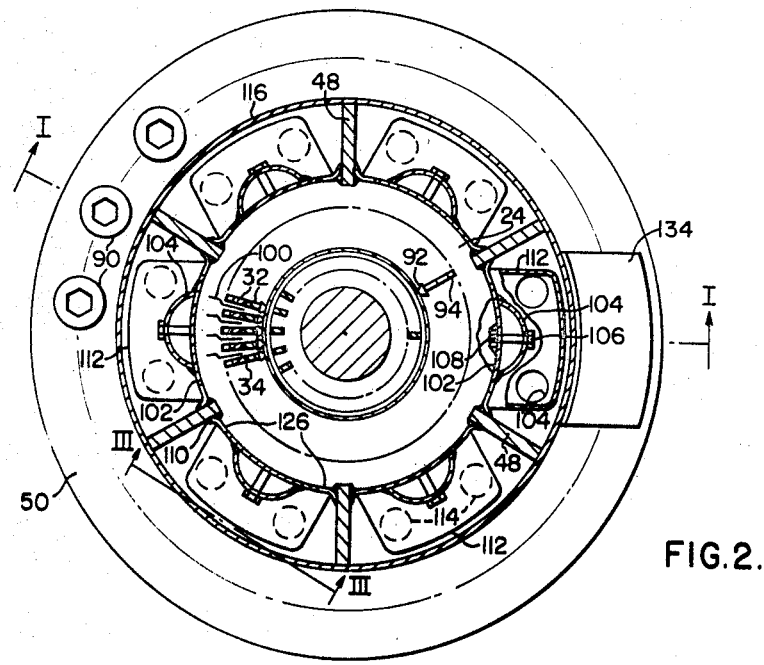
FIG. 2 is a view, in transverse section, taken along the line II—II in FIG. 1.
Figure 3:
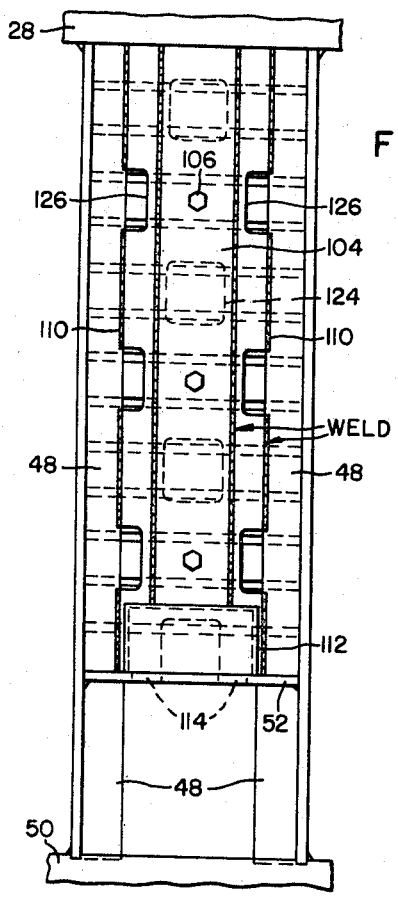
FIG. 3 is a view, in elevation, of a portion of the structure shown in FIG. 1.
Figure 4:
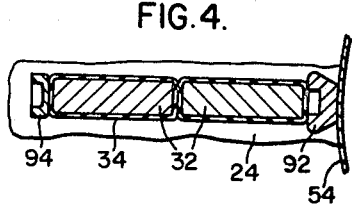
FIG. 4 is an enlarged detail view, of one feature of the invention.

As shown more clearly in FIGS. 2 and 3, a plurality of longitudinal building bars 48 are spaced around the outer periphery of the stator laminations 24. In the present instance, six bars 48 are provided. The top ends of the building bars 48 are welded, or otherwise secured, to the upper flange plate 28. The bottom ends of the bars 48 are welded, or otherwise secured, to a lower end ring 50. In this manner, the stator core is tied together, thereby strengthening the stator structure. The lower finger plate 30 is retained in position by means of supporting plates 52 disposed between the building bars 48 and welded, or otherwise secured, to the building bars and the finger plate 30.

In order to seal off the stator windings 32 from the rotor cavity 26, a cylindrical stator can 54 extends through the rotor cavity and is welded at its ends to the end rings 36 and 50. The stator can 54 is composed of a relatively thin corrosion resistant material, such as stainless steel, or other suitable material. The can 54 is reinforced by the stator laminations 24 and backup sleeves 46 disposed above and below the laminations, thereby enabling the stator can to withstand relatively high pressure.

The rotor assembly 12 includes a shaft 58 and rotor bars 60 which may be of the squirrel cage type. The shaft 58 is rotatably mounted in the rotor cavity 26 by means of an upper radial bearing assembly 62 and a lower radial bearing assembly 64. The upper assembly 62 includes a bearing journal 66 secured to the shaft 58, a bearing sleeve 68 composed of a suitable material, such as graphite, and a bearing support or housing 70. The upper end of the housing 70 has an outwardly extending flange which is clamped between a shoulder on the inner periphery of the end ring 36 and the end cap 42, thereby retaining the housing 70 in position. The lower bearing assembly 64 includes a bearing journal 72 secured to the shaft 58, a bearing sleeve 74 and a bearing housing 76.

The housing 76 has an outwardly extending flange which is attached to the lower end ring 50 by means of bolts 78.

The weight of the rotor assembly is supported by a thrust runner 80 secured to the rotor shaft 58 and rotatably supported by a thrust bearing assembly 82 disposed in a thrust bearing housing 84. The thrust bearing assembly 82 may be of a type well known in the art. The housing 84 has an outwardly extending flange 86 which is clamped between the impeller casing 16 and the lower end ring 50. The flange 86 may also be attached to the end ring 50 by means of cap screws 88. The casing 16 is attached to the end ring 50 by means of bolts 90 which extend through the end ring and are threaded into the casing 16.

In order to provide for cooling the motor pump by means of air, or other suitable gas, generally channel-shaped wedges 92 and 94 are provided at the top and the bottom, respectively, of each stator slot 34 to provide vertical passageways 96 through the laminations 24. Radial air vents 98, which communicate with the passageways 96, are provided in the laminations by means of spacing fingers 100 disposed between groups of the laminations. In this manner, air is permitted to circulate through the passageways 96 and the vents 98.

As shown more clearly in FIG. 2, a cover 102 containing a generally semi-cylindrical gas duct 104 is provided between each pair of building bars 48. The cover 102 is attached to the laminations 24 by means of bolts 106 which are threaded into nuts 108 and secured to the laminations, as by welding. The core is sealed by welding the cover 102 to the building bars 48 as shown at 110. The lower end of each cover 102 has an enlarged generally rectangular portion 112 as shown in FIGS. 1, 2 and 3. The enlarged portion 112 extends over openings 114 in the supporting plate 52. An outer cover 116 surrounds the outer edges of the building bars 48 and is attached to the upper finger plate 28 and the lower end ring 50 by means of bolts 118. This arrangement provides two separate air, or gas chambers 120 and 122. The chamber 120 is between the outer cover 116 and the duct 104. The chamber 122 is within the duct 104 between the stator laminations and the wall of the duct. As shown more clearly in FIGS. 2 and 3, openings 124 and 126 are provided in the cover 102 between two adjacent radial vents 98 inside and outside, respectively, of the duct 104.

A blower (not shown), which may be mounted on the upper end ring 36 by means of a supporting structure 128, directs air, or gas, into the chamber 40 around the upper end turns of the stator winding 32. A portion of the air flows through openings 130 in the upper finger plate 28, circulates through the passages 96 and the radial vents 98 and is blown into the chamber 122 within the duct 104. The flow of air or other gas coolant is shown by the arrows in FIG. 1.

Additional air is blown through openings 132 in the finger plate 28 into the chamber 120 between the cover 116 and the duct 104. As shown by the arrows in FIG. 1, this air enters the radial vents 98 from outside the stator core through the openings 126 in the cover 102 and must flow downwardly through the passages 96 to adjacent vents 98 from which it is discharged into the chamber 122 through openings 124 in the cover 102.

The air is discharged from the chamber 122 through the openings 114 in the supporting plate 52 into the area around the lower end turns of the stator windings 32 and then to atmosphere through a cover 134 attached to the lower end of the cover 116. It will be noted that the stator can 54 forces the air to circulate through the passages 96 and the radial vents 98 by preventing the air from entering the rotor cavity. Thus, the stator can cooperates in providing efficient cooling of the motor by means of air or other suitable gas coolant.

If desired, the motor pump may also be cooled by circulating liquid obtained from impeller casing 16 through the rotor cavity and the rotor bearings by means of the auxiliary impeller 18. When the pump is connected in a circulatory system, the motor is filled by a liquid flowing from the casing 16 through passageways 136 in the impeller 14, past a labyrinth seal 138 into the chamber 139 within the thrust bearing housing 84 containing the thrust runner and the thrust bearings 82. The liquid then flows through a passageway 140 in the bearing housing 76 into the rotor cavity 26. The liquid is circulated by the auxiliary impeller 18 through a circulating path which includes a passageway 142 through the lower end ring 50, piping means 144, an external heat exchange 146, a passageway 148 in the upper end ring 36, a chamber 150, and a passageway 152 in the shaft 58 to the auxiliary impeller 18. The impeller 18 circulates the liquid through the gap between the stator can 54 and the rotor assembly 12. The liquid flows through and around the lower radial bearing assembly 64 into the chamber 139 containing the thrust runner and the thrust bearing. In this manner, the lower bearing assembly 64 and the thrust bearing are lubricated.

The pressure head developed by the auxiliary impeller 18 also forces liquid to flow through the upper bearing assembly 62 and around the assembly through a passageway 154 into the chamber 150. In this manner, the upper bearing assembly 62 is lubricated. Thus, a portion of the liquid being handled by the main impeller is utilized to assist in cooling the motor. If the external heat exchanger 146 is not required, it may be omitted from the cooling system and the pipe 144 connected directly to the passageway 148 in the upper end ring 36.

From the foregoing description it is apparent that the invention provides for efficiently cooling a motor pump structure by means of air or other suitable gas coolant. The gas cooling system may also be utilized in conjunction with a liquid cooling system by utilizing a portion of the liquid handled by the main impeller of the motor pump and circulating this liquid through the rotor cavity. The stator can which seals off the stator laminations and winding from the rotor cavity prevents the liquid from entering the fluid cooling system and vice versa. Furthermore, the motor structure is strengthened by means of the building bars which also function as a part of the gas cooling system.

Since numerous changes may be made in the above-described construction, and different embodiments of the invention may be made without departing from the spirit and scope thereof, it is intended that all subject matter contained in the foregoing description or shown in the accompanying drawing shall be interpreted as illustrative and not in a limiting sense.

We claim as our invention:

1. In a canned motor pump, in combination, a stator assembly including a plurality of annular laminations having a cylindrical bore providing a rotor cavity therethrough, longitudinal winding slots in the laminations, longitudinally extending stator windings in the slots, generally channel-shaped wedges in the tops and bottoms of the slots providing cooling passages along the slots adjacent the inner and outer longitudinal surfaces of the windings, respectively, radial vents in the laminations communicating with said passages, a cylindrical stator can extending through the bore to seal off the windings from the rotor cavity, and means cooperating with the can to circulate gas through the passages and the radial vents.

2. The combination defined in claim 1 wherein said means includes ducts attached to the outer periphery of the laminations.

3. The combination defined in claim 2 wherein said means also includes an outer cover surrounding the laminations and spaced from the ducts.

4. The combination defined in claim 3 wherein the stator assembly includes longitudinal bars spaced around the outer periphery of the laminations between the outer cover and the laminations.

5. The combination defined in claim 4 wherein the stator assembly also includes an upper finger plate to which the top ends of the bars are secured and a lower end ring to which the bottom ends of the bars are secured.

6. The combination defined in claim 4 including covers between said bars having openings therein between adjacent radial vents inside and outside the ducts to permit gas to flow into and out of the radial vents.

7. The combination defined in claim 5 including an upper end ring having an annular downwardly extending flange secured to the upper flange plate to provide a chamber between the end ring and the finger plate, blower means directing gas into the chamber, and openings in the finger plate permitting gas to enter the passages provided by the channel-shaped wedges.

8. In a canned motor pump, in combination, a stator assembly including a plurality of annular laminations having a cylindrical bore providing a rotor cavity therethrough, longitudinal slots in the laminations, stator windings in the slots, generally channel-shaped wedges in the tops and bottoms of the slots providing passages therethrough, radial vents in the laminations communicating with said passages, a cylindrical stator can extending through the bore to seal off the windings from the rotor cavity, means cooperating with the can to circulate gas through the passages and the radial vents, a rotor rotatably mounted in the rotor cavity inside the stator can, a main impeller driven by the rotor, a casing for the main impeller, and an auxiliary impeller driven by the rotor to circulate liquid obtained from the casing through the gap between the rotor and the stator can.

9. The combination defined in claim 8 including external piping means connecting opposite ends of the rotor cavity to provide a circulating path for the liquid.

10. The combination defined in claim 9 including heat exchanging means connected in the circulating path.

References Cited

UNITED STATES PATENTS

| | | | |
|---|---|---|---|
| 2,451,219 | 10/1948 | Holmgren | 310—58 |
| 2,568,548 | 9/1951 | Howard | 310—86 |
| 2,917,644 | 12/1959 | Laffoon | 310—64 |
| 2,994,004 | 7/1961 | Macha | 310—86 |

MILTON O. HIRSHFIELD, Primary Examiner

R. SKUDY, Assistant Examiner

U.S. Cl. X.R.

310—52, 54, 61